Dec. 12, 1950     E. M. VAN DORNICK     2,533,977

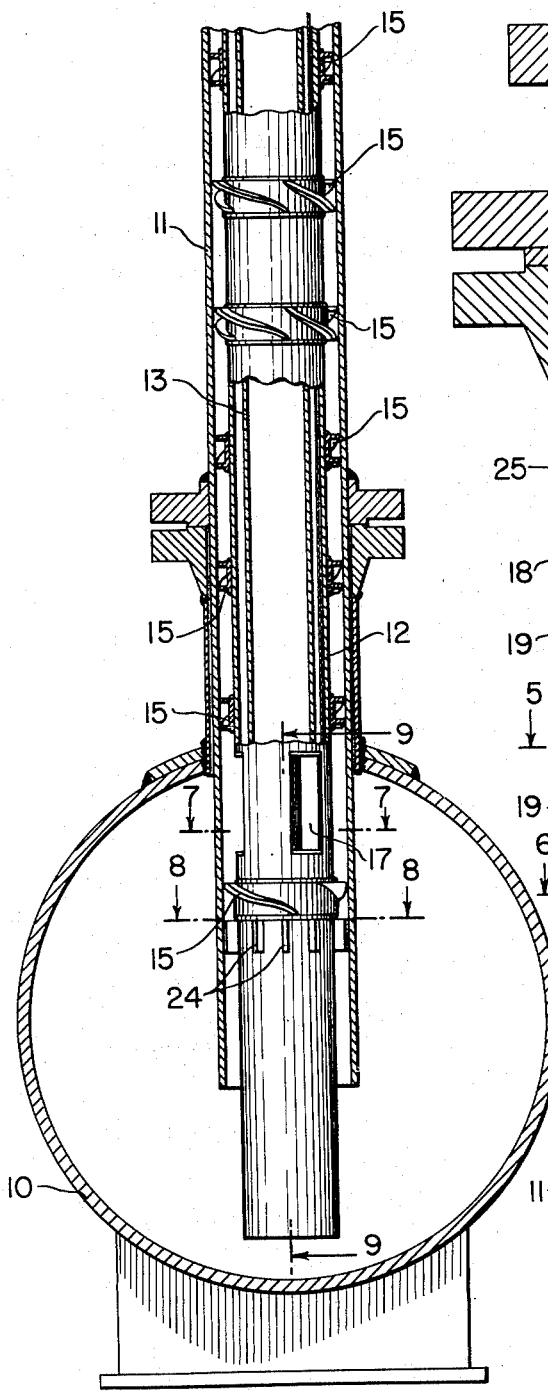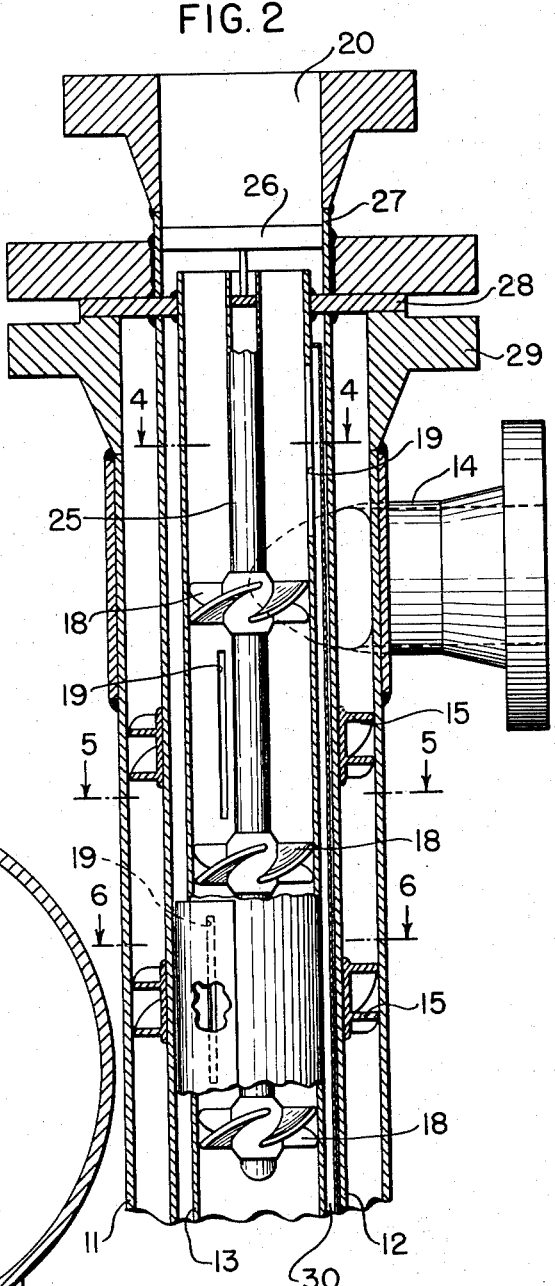

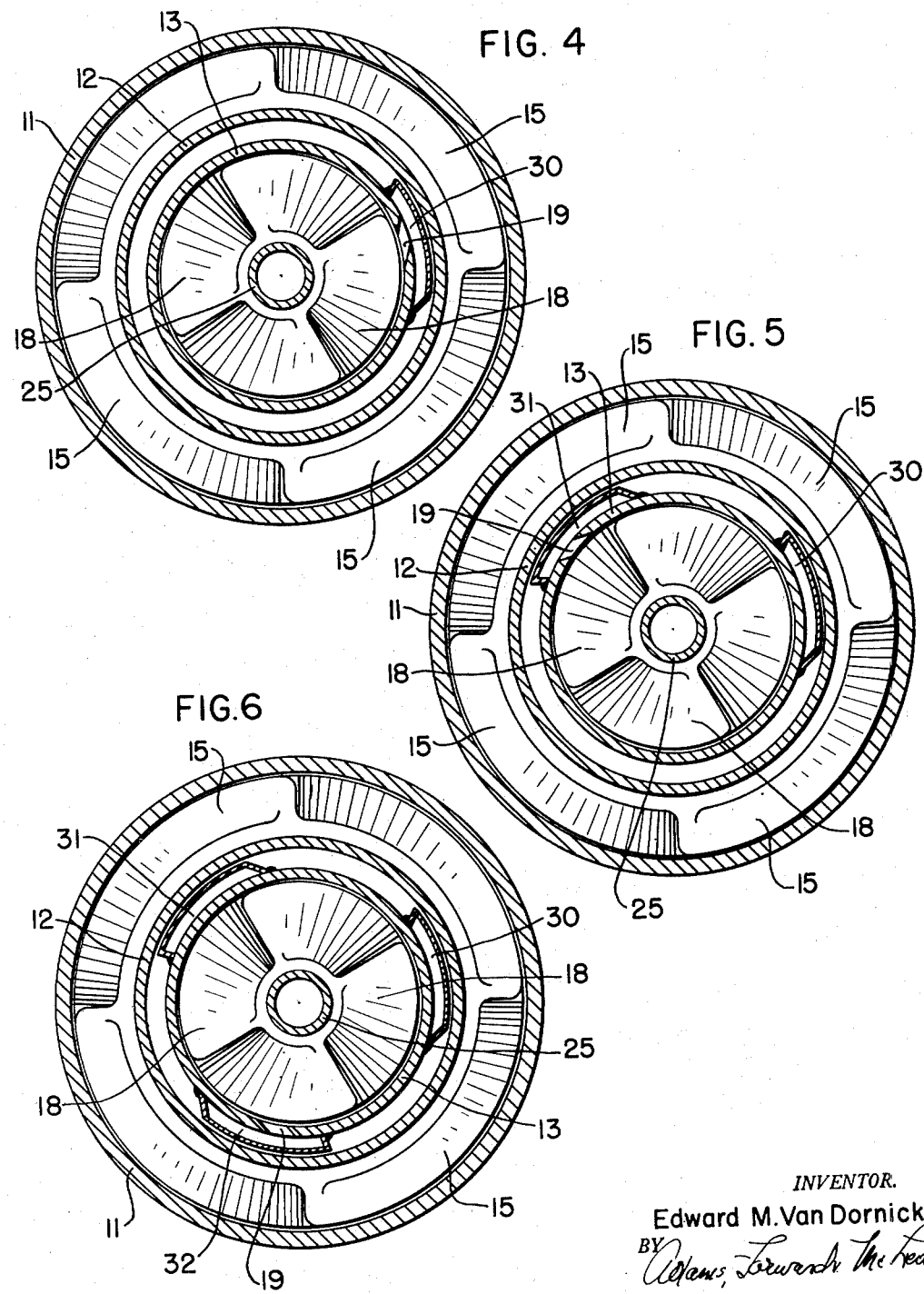

SEPARATOR

Filed Nov. 12, 1949     4 Sheets-Sheet 4

INVENTOR.
Edward M. Van Dornick

BY *Adams, Forward, McLean*

ATTORNEY

Patented Dec. 12, 1950

2,533,977

UNITED STATES PATENT OFFICE 2,533,977

SEPARATOR

Edward M. Van Dornick, Buena Vista, Calif., assignor to Arabian American Oil Company, New York, N. Y., a corporation of Delaware Application November 12, 1949, Serial No. 126,734

4 Claims. (Cl. 183—2.7)

My invention is a separator of special utility in the separation of mixtures of gas and crude oil formed in connection with the production of oil from high pressure formations. In the production of crude oil from such formations, as the oil passes through tubing in the well and control equipment at the well head and as the pressure on the oil is reduced to that at which it is to be handled above ground, gas in solution in the oil at the higher formation pressure comes out of solution and forms, with the liquid oil, foams of some stability. Conventionally, these foams are broken and separated by introducing the gas-oil mixture into one end of a horizontally elongated vessel and discharging the separated gas and oil above and below, respectively, a liquid level being maintained in the vessel at the other end of the vessel, the vessel being made large enough to provide sufficient residence time to have the foam break and the separation occur. Actually, the separation is not as simple as might appear superficially from this practice for not only must entrained gas be separated from the oil but also entrained oil mist must be separated from the gas. Such separators are large, costly and quite immobile. For working pressures of the order of 800–1000 lbs. per square inch, the cost of such vessels becomes prohibitive. The separator of my invention is effective and efficient, it is compact and mobile, it is flexible with respect both to quantities of oil and gas and the ratios of gas to oil in the mixtures it can handle, and in terms of capacity, particularly for higher working pressures, it is simply and economically fabricated.

Figure 1:
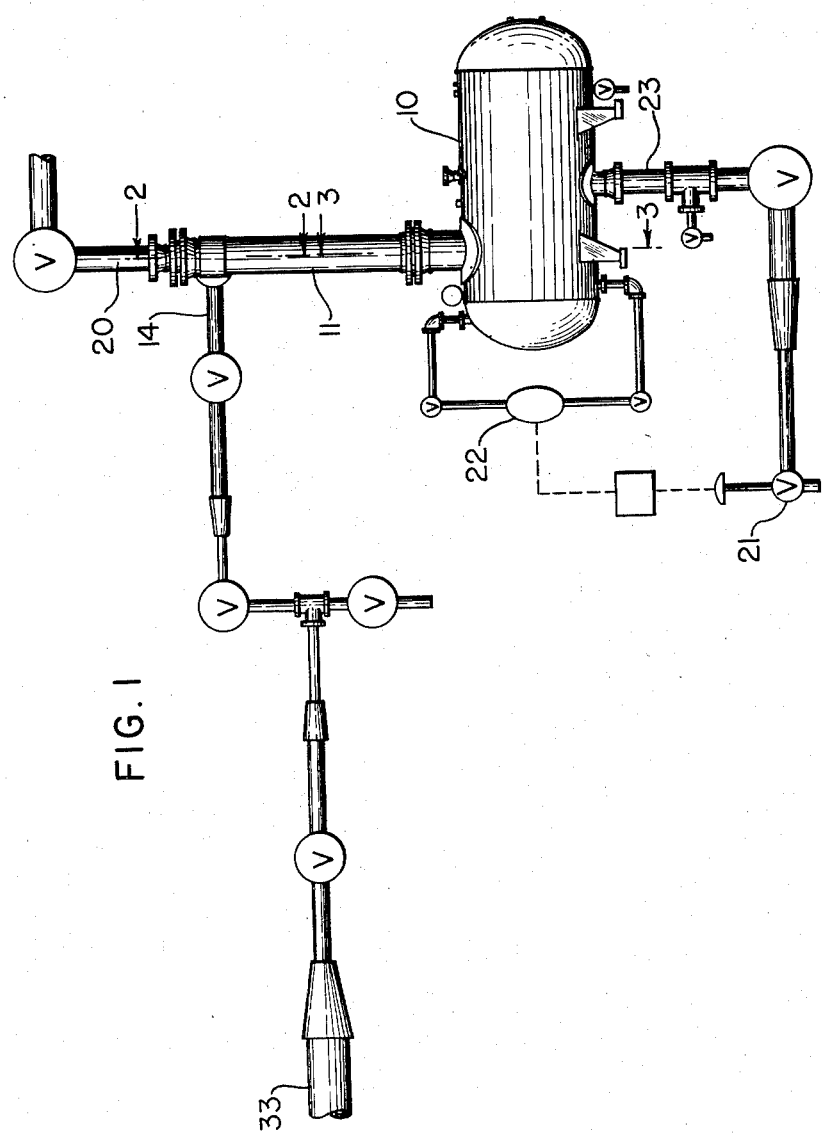
Figure 8:
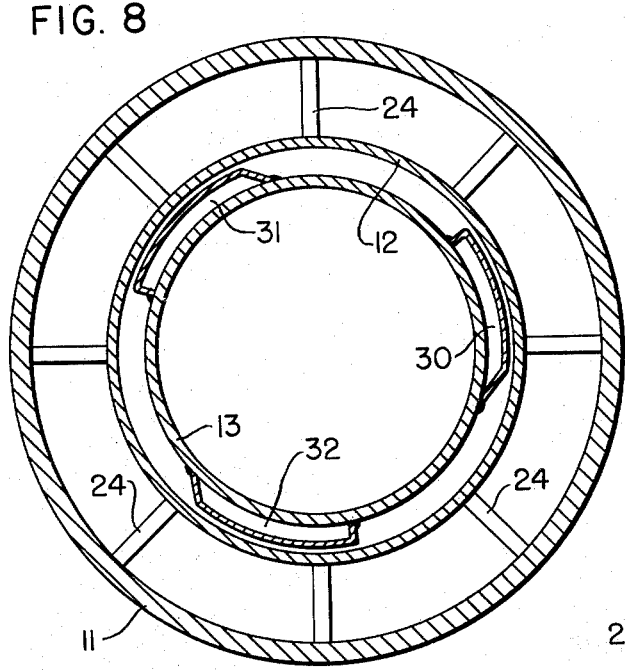
Figure 9:
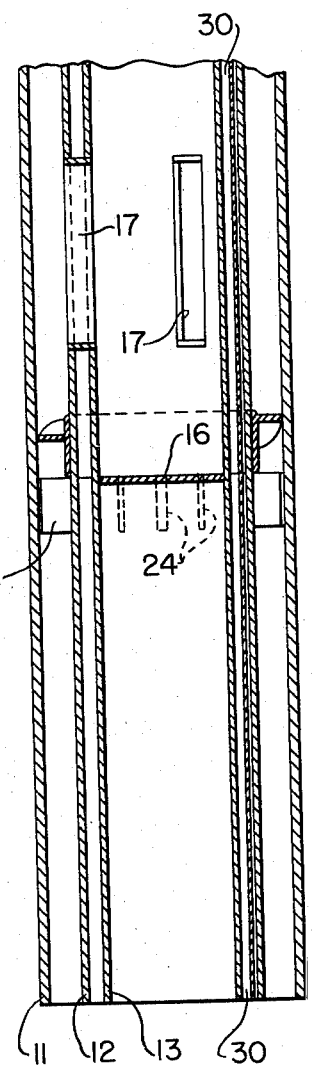
Figure 7:
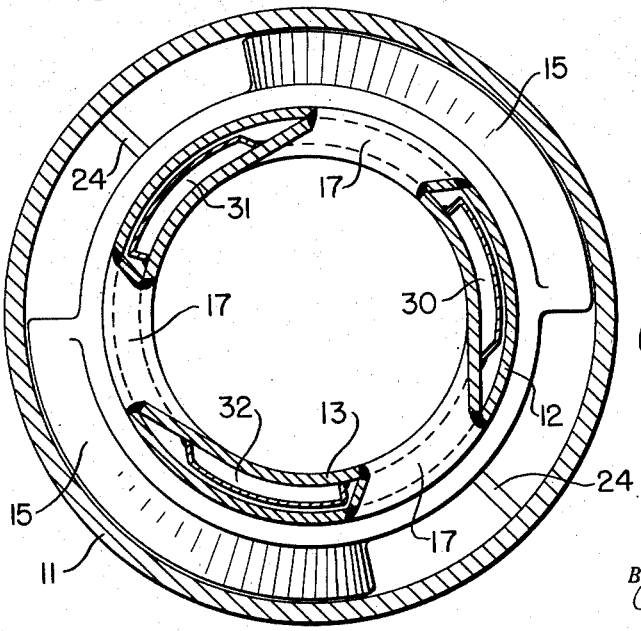

A gas-crude oil separator embodying my invention is illustrated in the accompanying drawings. Its characteristic construction and mode of operation will appear from this particular example which I will now describe in detail. In these drawings:

Fig. 1 is an elevation of an assembled separator embodying my invention;

Figs. 2 and 3 are enlarged sections on lines 2—2 and 3—3, respectively, of Fig. 1;

Figs. 4, 5 and 6 are enlarged sections on lines 4—4, 5—5 and 6—6, respectively, of Fig. 2; and Figs. 7, 8 and 9 are enlarged sections on lines 7—7, 8—8 and 9—9, respectively, of Fig. 3.

Referring to the drawings (see particularly Figs. 2, 3 and 9), the illustrated separator comprises a drum 10, a tube 11, vertically positioned in operation, opening into the drum below the normal liquid level therein, a second tube 12 extending through the first tube 11 and a third tube 13 extending through the second, a connection 14 for introducing gas-crude oil mixtures into the upper end of the annular space between tubes 11 and 12, a series of vanes 15 in this first annular space for imparting a rotary motion to fluid moving downwardly therethrough, a partition 16 closing the lower end of tube 13, passages 17 extending across the annular space between tubes 12 and 13 opening into the inner boundary of the lower part of the first annular space and connecting the lower part of this space with the lower part of the space within the tube 13 above the partition 16 and above the normal liquid level in the drum, another series of vanes 18 in the space within the tube 13 for imparting a rotary motion to fluids moving upwardly therethrough, passages 19 through the wall of the tube 13 opening into the peripheral boundary of the upper part of the space within the tube 13 and communicating through the second annular space, between tubes 12 and 13, with the lower part of the drum 10 at a level below the normal liquid level, a connection 20 for discharging gas from the upper end of the tube 13, means comprising a valve 21 and a float 22 responsive to the level in the drum 10 for actuating the valve 21 for maintaining a liquid level in the drum, and a connection 23 for discharging oil from the drum.

Connection 14 is with advantage arranged to open tangentially into the upper end of the annular space between tubes 11 and 12 (see Fig. 2) to impart a rotary motion to fluids moving downwardly through this annular space consistent with the rotary motion imparted by the vanes 15. The vanes 15 are with advantage fabricated as annular units and supported by tube 12. To minimize turbulence in the drum 10, a series of straightening baffles 24 are with advantage provided in the lower end of the annular space between tubes 11 and 12 below the lowermost of the vanes 15. The effective surfaces of the vane 15 next above such straightening baffles may be smaller in area or of steeper pitch than the effective surfaces of the higher vanes 15. The partition 16 may be provided with a small aperture, such that the opening is insignificant during operation, to permit the entire separator to be pumped out, for cleaning or inspection, by pumping out the drum 10. The vanes 18 are with advantage fabricated as units carried on a rod or tube 25 carried in turn by a spider 26. This spider may be carried by tube 13 or, as illustrated, by tube 27 supported by plate 28. Tubes 12 and 13, and tube 27, and thus the vanes 18 carried by rod or tube 25 as well as the vanes 15 carried by tube 12 are with advantage supported by plate 28, which also serves to close the upper end of the annular space between tubes 12 and 13, as a sub-assembly, supported by flange 29 at the upper end of the tube 11. Inspection, cleaning and repair are thus facilitated. The annular space between tubes 12 and 13 may constitute the passageway through which the ports 19 communicate with the drum 10, or, as indicated in Figs. 2–9, these passages may be arranged in the form of separate ducts 30, 31 and 32. In either case these ducts or the common passageway opens into the drum below the normal liquid level to provide a liquid seal against the discharge of gas through such passages. The passages 17 are with advantage arranged tangentially with respect to the central space within tube 13 to facilitate transfer of separated gas from the inner and lower part of the space between tubes 11 and 12 and the lower part of the space within tube 13 (see Fig. 7).

In operation, the separator of my invention functions, for example, as follows: crude oil with entrained gas forming a foam, delivered from the well head through connection 33, enters the upper end of the annular space between tubes 11 and 12, flows downwardly through this space, and as it flows downwardly therethrough is whirled in rotary motion subjecting the mixture to centrifugal force usually of the order of hundreds of times the force of gravity. As a consequence, the foam is broken and the whirling mixture rapidly segregates into an annular stream of oil moving along the inner surface of tube 11 and an annular stream of gas moving along the outer surface of tube 12. This stream of separated oil flows into the drum 10 through the open lower end of tube 11. The escape of separated gas through the lower end of tube 11 is prevented by maintaining a liquid level in the drum above the lower end of this tube to provide a liquid seal. The separated gas carrying entrained oil mist flows through the passages 17 into the lower end of the central space within tube 13 and thence upwardly through this space where it is again whirled in a rotary motion establishing centrifugal force of an order comparable to that established in the space between tubes 11 and 12. As a consequence, the oil droplets constituting the mist are rapidly segregated as a film flowing along the inner surface of the tube 13 which is discharged from the upper part of that surface to the body of liquid in the drum 10 through the ports 19 sealed against escape of gas therethrough by the circumstance that the discharge passages extend below the liquid level maintained in the drum providing a liquid seal. The separated gas is discharged from the upper end of the tube 13 through connection 20. The separated oil is discharged from the drum 10 through connection 23.

The following data will illustrate some of the operating characteristics and some of the advantages of the separator of my invention. I refer to a separator of the arrangement and proportions illustrated in the accompanying drawings in which the tube corresponding to tube 11 is 15 feet long and approximately 12 inches in internal diameter. Operating at 50 pounds per square inch gauge gas discharge pressure upon a gas-crude oil mixture having a gas:oil ratio expressed as standard cubic feet of gas per barrel of oil of 500:1, the separator will function at rates of from 1000 to 7500 barrels per day. As the gas:oil ratio decreases, the minimum rate for satisfactory operation tends to increase. Operating at 500 pounds per square inch gauge gas discharge pressure upon a gas-crude oil mixture having a gas:oil ratio of 1000:1, the separator will function at rates of from 3500 to 15,000 barrels per day; upon gas-crude oil mixtures having a gas:oil ratio of 700:1 from 3500 to 21,000 barrels per day. It will be understood that, as generalities, the figures above must be regarded as approximations—the varying characteristics of different crude oils will involve variations in rates, certainly in optimum rates. Actually, I believe that the limitations indicated by the above figures, both the lower ranges and the upper ranges of satisfactory operation, may be influenced as much by the characteristics of accessory apparatus, control valves, for example, now available, as by the characteristics of my separator. Operating within the ranges of the above figures, the force applied in separation of the gas-crude oil mixtures will range from something of the order of 200–300 g. to as much as 5000 g. or more.

The first annular space, that between tubes 11 and 12 in the separator illustrated, is proportioned, or the rate at which the gas-crude oil mixture is supplied to the particular unit is adjusted, to provide sufficient residence time to have the foam break and separate in this space. This time varies inversely with the applied separating force. Thus, if the time factor required in a conventional separator, in which the applied force is 1 g., were 70 seconds for example, a time factor of less than 1 second, usually less than $\frac{1}{4}$ second and in some cases less than $1/20$ second, is effective in my improved separator. Vanes, such as those designated 15 and 18, are provided at intervals spaced to maintain a high angular velocity throughout the length of the first annular space and the space within the inner tube. The spacing illustrated is useful generally independently of the length of travel, fixed by reference to the time factor, through the first annular space and the central space.

I claim:

1. A gas-crude oil separator comprising a drum, means for maintaining a liquid level in the drum, a vertical tube opening into the drum below the normal liquid level, a second vertical tube extending through the first and a third vertical tube extending through the second, a connection for introducing gas-crude oil mixtures into the upper end of the annular space between the first and second tubes, a series of vanes in this first annular space for imparting a rotary motion to fluids moving downwardly therethrough, a partition closing the lower end of the third tube, passages extending across the annular space between the second and third tubes opening into the inner boundary of the lower part of the first annular space connecting the lower part of the first annular space with the lower part of the space within the third tube above the partition and above the normal liquid level in the drum, another series of vanes in the space within the third tube for imparting a rotary motion to fluids moving upwardly therethrough, passages through the second annular space opening into the peripheral boundary of the upper part of the space within the third tube and into the drum below the normal liquid level, a connection for discharging gas from the upper end of the third tube and a connection for discharging oil from the drum.

2. The separator of the first claim in which the gas-crude oil connection opens into the upper end of the first annular space tangentially for imparting an initial rotary motion to fluids moving downwardly therethrough consistent with the motion imparted by the vanes in this space.

3. The separator of the first claim including a series of straightening baffles in the lower end of the first annular space below the lowermost vane in this space.

4. The separator of the first claim in which the second and third tubes and the vanes in the first annular space and in the space within the third tube are supported as a sub-assembly from the upper end of the first tube.

EDWARD M. VAN DORNICK.

REFERENCES CITED

The following references are of record in the file of this patent:

UNITED STATES PATENTS

| Number | Name | Date |
|---|---|---|
| 2,316,729 | Tryon | Apr. 13, 1943 |
| 1,782,783 | Katzebue | Nov. 25, 1930 |